(12) United States Patent
Berg et al.

(10) Patent No.: US 6,551,731 B1
(45) Date of Patent: Apr. 22, 2003

(54) FUEL CELL SYSTEM

(75) Inventors: Norbert Berg, Darmstadt (DE); Gerhard Filip, Kronberg (DE); Bernd Kohlstruck, Neu-Anspach (DE); Arnold Lamm, Thalfingen (DE)

(73) Assignee: AEG Energietechnik GmbH, Frankfurt (DE)

( * ) Notice: Subject to any disclaimer, the term of this patent is extended or adjusted under 35 U.S.C. 154(b) by 0 days.

(21) Appl. No.: 09/720,061
(22) PCT Filed: May 28, 1998
(86) PCT No.: PCT/EP98/03155
§ 371 (c)(1),
(2), (4) Date: Mar. 31, 2001
(87) PCT Pub. No.: WO98/54777
PCT Pub. Date: Dec. 3, 1998

(30) Foreign Application Priority Data

May 29, 1997 (DE) .......................................... 197 22 598

(51) Int. Cl.$^7$ ................................................ A01M 8/04
(52) U.S. Cl. ............................ 429/13; 429/17; 429/23; 429/38
(58) Field of Search ............................ 429/13, 17, 23, 429/38

(56) References Cited

U.S. PATENT DOCUMENTS

| 5,366,821 A | 11/1994 | Merritt |
| 5,605,770 A | * 2/1997 | Andreoli et al. ............... 429/20 |
| 5,677,073 A | * 10/1997 | Kawatsu ....................... 429/22 |

FOREIGN PATENT DOCUMENTS

| DE | 195 38 381 | 4/1997 |
| FR | 1 536 877 | 8/1968 |
| GB | 1 534 015 | 11/1978 |
| JP | 04 047 674 | 2/1992 |
| WO | WO 97 15 106 | 4/1997 |

OTHER PUBLICATIONS

H. Kohlmüller: "Digitale Regelung eines Hydrazin–Sauerstoff–Brennstoffzellennotstr omaggreates" Messtechnik, vol. 81, No. 3, 1973, pp. 84–86, XP002079800 Erlangen see p. 84, right–hand column, last paragraph—p. 85, left–hand column, paragraph 2; figure 2 (no month).

Norio Eguchi et al: "Fuel Cells for Telecommunications" Japan Telecommunications Review, vol. 22, No. 1, Jan. 1980, pp. 75–79, XP002079801 see abstract, see p. 76, right–hand column, paragraph 3–77, left–hand column, paragraph 1; figure 4, see figure 7.

* cited by examiner

Primary Examiner—Carol Chaney
Assistant Examiner—Tracy Dove
(74) Attorney, Agent, or Firm—Paul Vincent

(57) ABSTRACT

The invention relates to a fuel cell system (11, 111) comprising an anode chamber (13, 113) and a cathode chamber (14, 114) which are separated from each other by a proton conducting membrane (15, 115). When the fuel cell system is operated, fuel, in particular $H_2$ or a water/methanol mixture, can be fed to the anode chamber and an oxidant, in particular oxygen, can be fed to the cathode chamber. In standby mode, the cathode chamber (14, 114) does not allow flow through and the oxidant and fuel are present in both the cathode chamber (14, 114) and the anode chamber (13, 113), respectively. The fuel cell system remains at operating temperature in the standby mode. This enables the fuel cell system (11) to be used as a combined interruption-free power supply unit and backup unit.

33 Claims, 4 Drawing Sheets

FUEL CELL SYSTEM

BACKGROUND OF THE INVENTION

The invention concerns a fuel cell system as well as a method for operation of a fuel cell system, having an anode chamber and a cathode chamber which are separated from each other by a proton conducting membrane, wherein, during an operational state, a fuel can be introduced to the anode chamber and an oxidant, in particular oxygen, can be introduced to the cathode chamber. The invention also concerns a system for interruption-free power supply to at least one electrical user whose energy is normally extracted from an alternating current power network and, in the event of failure of the alternating current power network, energy can be extracted from a fuel supply system. The invention also concerns a method for operating the system.

German patent application P 195 38 381 describes a system for interruption-free power supply to electrical users with which, in the event of power mains failure, a so-called PEM fuel cell (polymer electrolyte membrane) takes over power supply to the user. Towards this end, inlets introduce fuel and an oxidant to the fuel cell. Valves are disposed in these inlets which are closed in the standby state of the fuel cell when the alternating current power network is functioning. During the standby state of the fuel cell, no fuel and no oxidant gains entrance into the fuel cell. Should the power network fail, the valves are opened and the fuel and oxidant are introduced into the fuel cell. The fuel cell is then transferred into an operational mode. In this operational mode, the fuel and the oxidant react in the fuel cell to produce electrical energy.

The transition from the standby state into the operational state of the fuel cell is therefore effected with the assistance of valves. These types of valves, in particular electromagnetically operated valves, have a response time of at least approximately 100 ms. Power network failure can therefore only be compensated for following an interruption time of approximately 100 ms.

It is the underlying purpose of the invention to create a fuel cell system as well as a method for operation of a fuel cell system and a system for interruption-free power supply with which a downtime of less than 100 ms can be achieved.

SUMMARY OF THE INVENTION

This purpose is achieved in accordance with the invention with a fuel cell system or a method of the above mentioned kind in that, in the standby state, the oxidant is present in but does not flow through the cathode chamber. The oxidant thereby preferentially exercises pressure on the membrane.

The oxidant is therefore also present in the cathode chamber in the standby state when the alternating current power network is functioning. When the power network breaks down it is therefore not necessary, as was the case in prior art, to first open a valve in order to introduce the oxidant into the cathode chamber. Rather, the oxidant is already present in the cathode chamber and the fuel cell system can therefore take over current supply to the user without delay.

The invention therefore facilitates downtimes between the breakdown of the alternating current power network system and takeover by the fuel cell system which are substantially less than 100 ms. The fuel cell system in accordance with the invention can therefore preferentially be used in a system for interruption-free power supply to electrical users.

In a preferred embodiment of the invention, the cathode chamber is connected to a cathode outlet having a blocking member, in particular a magnetic valve, which is closed in the standby state. In this manner, the cathode chamber can be closed in the standby state at least one side so that the oxidant is present in but cannot flow through the cathode chamber. In the operational state, the blocking member is opened so that the oxidant can then flow through the cathode chamber. Continuous reactions between the fuel and the oxidant then occur.

In a preferred embodiment of the invention, the cathode chamber is connected to a first cathode inlet which is connected to at least one tank, filled with oxidant or the like, via a blocking member, in particular a magnetic valve and/or a pressure reducer. This represents a particularly simple and economical method for making the oxidant available during the standby state.

In an additional advantageous embodiment of the invention, the cathode chamber is connected to a second cathode inlet which is connected, via a blocking member and preferentially a magnetic valve, to a compressor or the like which intakes a gas, preferentially air. The oxidant, in particular oxygen, must not thereby be extracted from the tank during the operational state, rather can easily e.g. be extracted from the air. The oxidant is therefore initially taken from the tank and introduced into the cathode chamber and Subsequent thereto, for prolonged operation, a gas, in particular air, is suctioned into the cathode chamber. The oxidant contained in the tank is therefore not used-up during the operational state of the fuel cell system so that a filling up or an exchange of the tank is only rarely required.

In a particularly preferred embodiment of the invention, the fuel is present in the anode chamber during the standby state. The fuel preferentially exercises pressure on the membrane. Towards this end, it is possible for the fuel to either be statically disposed in the anode chamber, e.g. in the form of hydrogen from a pressure vessel, or the fuel, e.g. a liquid fuel can flow in intervals or continuously through the anode chamber. It is only important that the fuel be present in the anode chamber at the membrane. Therefore, the fuel is also present in the anode chamber during the standby state when the alternating current power network is functioning. When the power network breaks down, it is not necessary, as was the case in prior art, to initially open a valve to introduce the fuel into the anode chamber. Rather, the fuel is already present in the anode chamber and the fuel cell system can therefore take over current supply to the user without any delay.

In a particularly preferred embodiment, the fuel cell is maintained at an optimal operating temperature in the standby state. The power capability of the fuel cell at 80 to 100° C. is approximately twice that at room temperature (20 to 30° C.). This can be effected by temperature controlling a circuit having liquid fuel or with a separate temperature controlled circuit. Heating is effected by the power mains. This measure improves the instantaneous efficiency of current delivery in the event of network failure. In this manner, the number of cells (stack) can be substantially reduced, which is definitive for investment costs.

The method in accordance with the invention therefore introduces a fuel cell system which, in the standby state with functioning alternating current power network, has a cathode chamber closed at at least one side, but filled with an oxidant so that the oxidant is present in the cathode chamber. The anode chamber is filled with fuel. As a result, the fuel cell system in accordance with the invention produces an off-load voltage in the standby state.

Since the cathode chamber has no through flow in this state, the fuel cell system can only deliver current for a short period of time when loaded, e.g. after a power network failure. One overcomes this situation by opening the blocking member of the cathode chamber during the transition from the standby state into the operational state. The cathode chamber is thereby no longer closed-off and the oxidant can flow through the cathode chamber. In this manner, continuous electrochemical reactions can occur in the fuel cell so that current can be continuously produced. In this operational state, the fuel cell system can then replace the broken down alternating current power network. An $H_2/O_2$ cell of approximately 1500 l delivers a power of 250 kW at 80° C. over a period of several hours with low (less than 2 bar) sound levels and substantially without pollutant emission.

The amount of time required to open the blocking member assumes values of approximately 100 ms for electromagnetically operated valves. This response time of approximately 100 ms does not however present a problem to the invention, since sufficient reactions can already occur during this time. In prior art, the system did not allow reactions during the time when the valve was being opened. The system in accordance with the invention delivers current within 10 ms.

By exercising pressures in the cathode chamber and the anode chamber which are preferentially of equal size and e.g. assume values of approximately 2 bar, no pressure difference is present across the membrane so that no damage to the membrane can occur.

In an advantageous improvement of the invention, the anode chamber is connected to an anode circuit for introduction of a liquid fuel (e.g. methanol). It is particularly advantageous when this anode circuit comprises a pump and a heater. The fuel can thereby be caused to flow through the anode chamber in a particularly simple manner. In addition, the fuel cell can be easily maintained in the standby state at a desired temperature.

In an advantageous embodiment of the invention, the anode circuit is pressurized. The fuel thereby exercises a permanent pressure on the membrane. This improves the reactions between the fuel and the oxidant such that the fuel cell system in accordance with the invention can switch from the standby state into the operating state in a particularly rapid fashion. In addition, the pressure exercised by methanol fuel in the anode circuit substantially reduces losses due to carbon dioxide discharge.

In an advantageous improvement of the invention, the anode chamber and cathode chamber are accommodated in a gas-tight and optionally additionally heat-insulated housing. In this manner, one prevents the temperature of the fuel in the anode circuit from being substantially influenced by external factors and is therefore reduced to only an insignificant extent, in particular during the standby state. It is particularly advantageous when the housing is pressurized, in particular subjected to nitrogen pressure. This substantially suppresses leakage from the anode chamber and/or the cathode chamber. In addition, the nitrogen pressure prevents boiling of a liquid fuel in the anode circuit, in particular boiling of a methanol/water mixture.

Further features, applications, and advantages of the invention can be derived from the following description of the invention using embodiments represented in the figures. All features shown and described constitute aspects of the invention either alone or in arbitrary mutual combination independent of their composition in the patent claims or their dependencies as well as independent of their formulation or representation in the description or in the drawing.

DESCRIPTION OF THE PREFERRED EMBODIMENT

Figure 1:
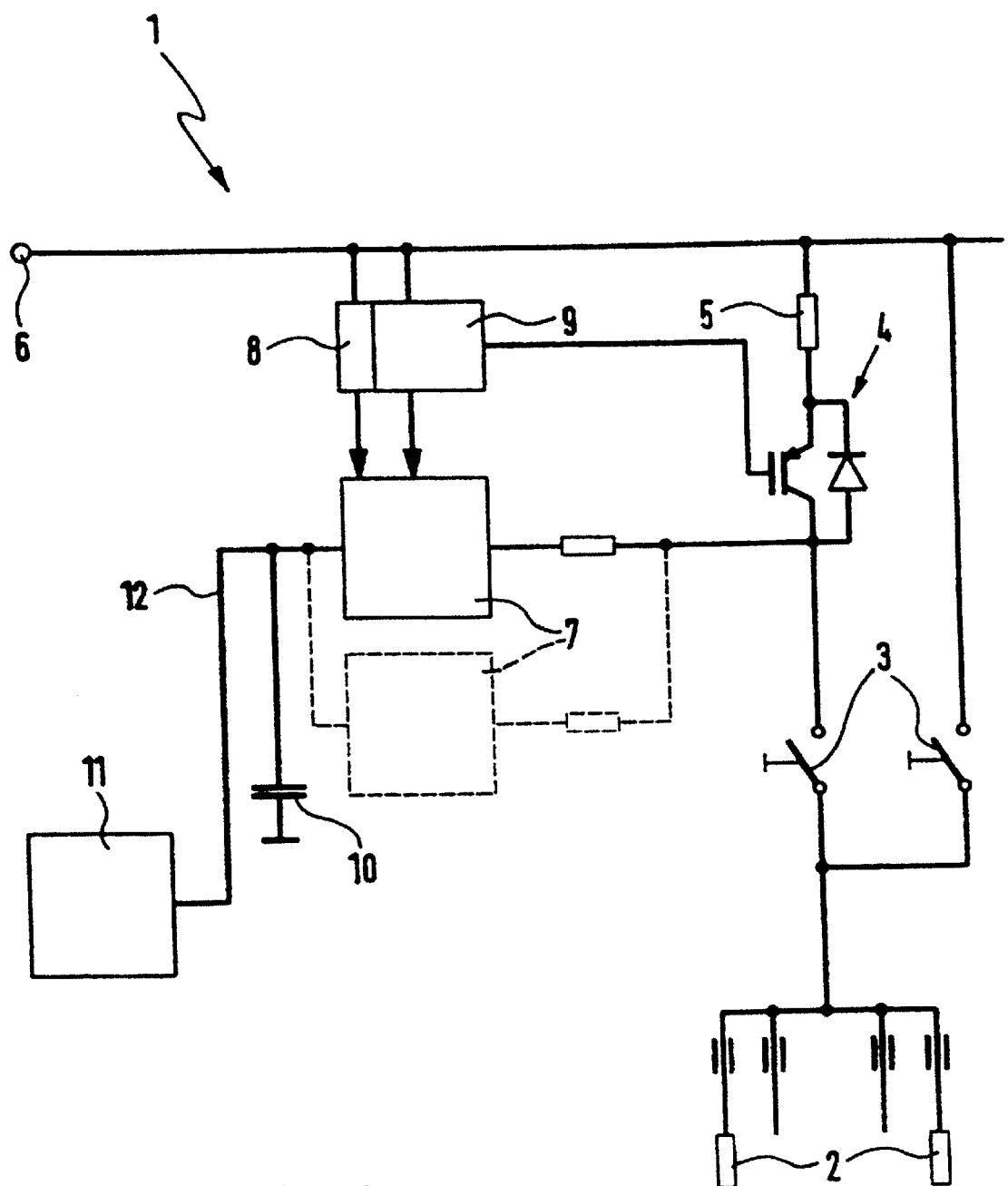
FIG. 1 shows a schematic block circuit diagram of an embodiment of a system in accordance with the invention for interruption-free power supply to at least one electrical user.

FIG. 1 shows a system 1 for interruption-free power supply to at least one electrical user. A system of this kind can e.g. be used as a so-called interruption-free current supply (ICS) for a computer center or the like. The user, e.g. an electrical unit in the computer center, is normally connected to an alternating current power network. Should the network break down, the system 1 takes over current supply to the user. One normally requires that the system 1 be capable of taking over the power supply within several milliseconds.

FIG. 1 shows a plurality of electrical users 2, represented by resistance symbols. The users 2 are connected to a rapidly switching switch 4 via a common bypass switch 3. The bypass switch 3 can be operated by hand. Switch 4 can be a contact-free switching element, e.g. anti-parallel circuited thyristors or the like.

The input to circuit 4 is connected to an alternating current power network 6 via a choke 5. In addition, a first and optionally an additional DC-AC converter 7 are circuited in parallel with respect to each other and are connected to the output side of the switch 4 proximate the user.

An auxiliary rectifier 8 is circuited between the alternating current power network 6 and the DC-AC converter 7 which covers the no-load losses of the DC-AC converter 7. In addition, the auxiliary rectifier 8 feeds a control unit 9 which is connected to the control input of the switch 4.

The input rectifiers of the DC-AC converter 7 are connected to a capacitor 10, circuited to ground, and to a fuel cell system 11 via an electrical cable 12.

During normal operation of the alternating current power network 6, current flows via the closed switches 4 and 3 to the users 2. A failure in the alternating current power network 6 is recognized by the control unit 9. The control unit 9 then switches the switch 4 into its open state. The current supply to the user 2 is then taken over by the fuel cell system 11 via the DC-AC converter 7. The capacitor 10 thereby serves to bridge switching from the alternating current power network 6 to the fuel cell system 11 and also smoothes out the voltage produced by the fuel cell system 11.

Figure 2:
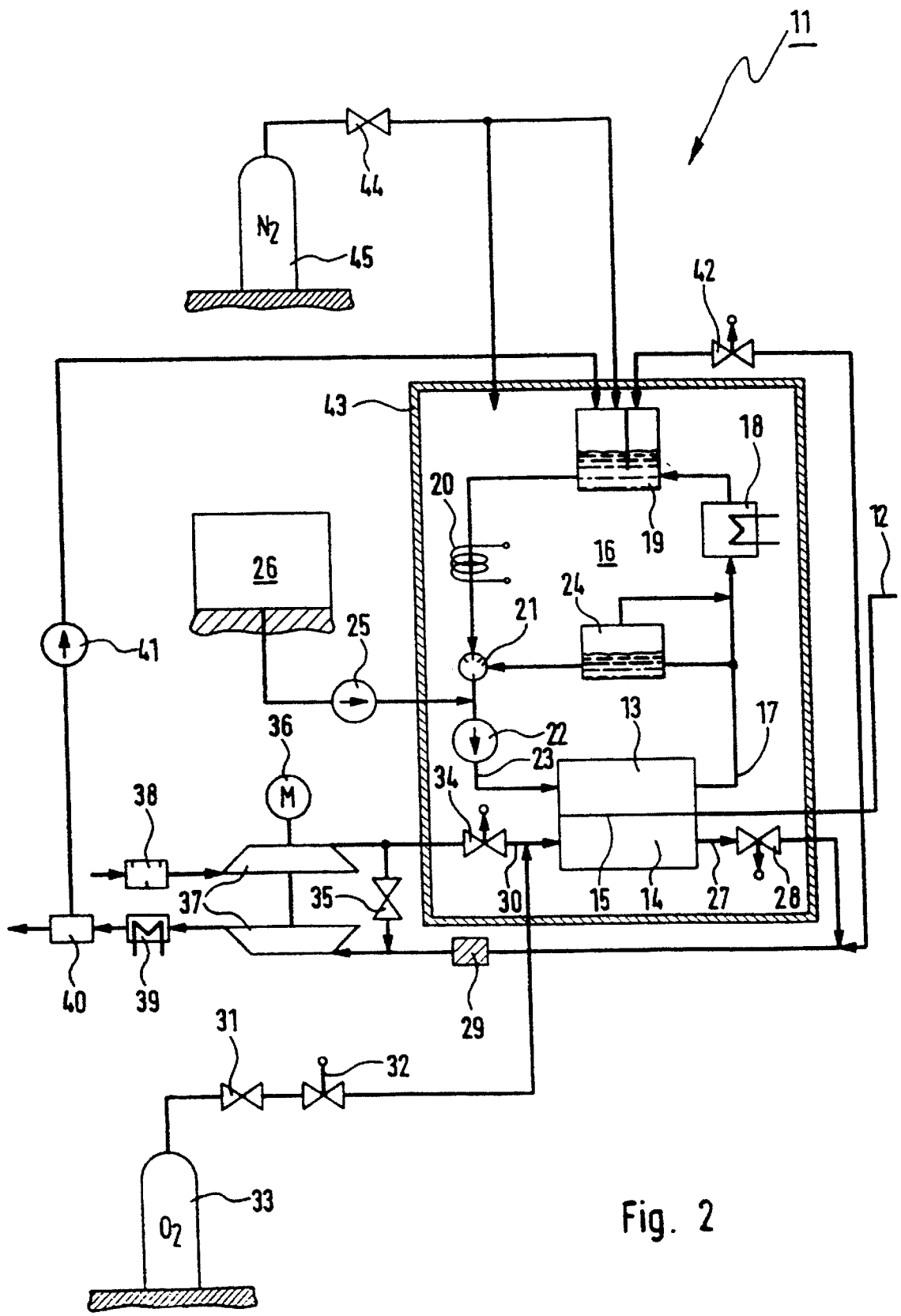
FIG. 2 shows a schematic block circuit diagram of an embodiment of a fuel cell in accordance with the invention for use in the system according to FIG. 1.

A first embodiment of the fuel cell system 11 is shown in detail in FIG. 2. It has an anode chamber 13 and a cathode chamber 14 which are separated from each other by means of a proton conducting membrane 15. The anode chamber 13, the cathode chamber 14 and the membrane 15 form a so-called direct methanol fuel cell (DMFC) in which electrical energy is produced by electrochemical processes. This energy, in the form of electrical voltage and current, can be tapped via the electrical cable 12.

The anode chamber 13 is connected to an anode circuit 16 which, departing from an anode outlet 17, via a cooler 18, a two chamber separator 19, a heater 20, a thermostat valve 21 and a cooling pump 22, is connected to an anode inlet 23. An additional separator 24 is connected to both the anode outlet 17 as well as to the thermostat valve 21. A tank 26 is connected to the anode circuit 16 upstream of the cooling pump 22 via a dosing pump 25.

The cathode chamber 14 is connected, via a cathode outlet 27, to a magnetic valve 28 whose output is connected to a catalytic burner 29. In addition, the cathode chamber 14 is connected to a tank 33 via a cathode inlet 30, a pressure reducer 31, and a magnetic valve 32. The cathode inlet 30 is likewise connected to a magnetic valve 34 which, via a bypass magnetic valve 35, is connected to that side of the catalytic burner 29 opposite the magnetic valve 28.

The two sides of the bypass magnetic valve 35 are connected to the outputs of a compressor-expander unit 37, driven by a motor 36. One of the inputs of the unit 37 intakes air via filter 38. The other input of the unit 37 is connected, via a cooler 39, a drain 40, and a pump 41 to the separator 19 of the anode circuit 16. This separator 19 is also connected to the catalytic burner 29 via a magnetic valve 42.

The anode chamber 13, the cathode chamber 14, the membrane 15, the anode circuit 16 having the anode outlet 17, the cooler 18, the separator 19, the heater 20, the thermostat valve 21, the coolant pump 22, the anode inlet 23 and the separator 24, as well as the cathode outlet 27, the magnetic valve 28, the cathode inlet 30 and the magnetic valve 34 are accommodated in a housing 43. The housing 43 is gas-tight, pressure resistant and heat insulated. The housing 43 is connected to a tank 45 via a pressure reducer 44. The tank 45 is also connected to the separator 19 of the anode circuit 16 via the pressure reducer 44.

Oxygen is present in tank 33, which is provided as the oxidant. Tank 26 contains methanol, which is provided as the fuel. Nitrogen is present in tank 45, which is provided as a pressure agent. In addition, the anode circuit 16 contains cooling water.

When the alternating current power network 6 functions, the fuel cell system 11 is in a standby state in which the magnetic valve 28 is closed. The magnetic valves 34 and 42 as well as the bypass valve 35 are also closed. The magnetic valve 32 is opened.

The closed magnetic valves 28 and 34 and the opened magnetic valve 32 cause the cathode chamber 14 to be filled with oxygen from the tank 33. The oxygen is then present in the cathode chamber 14 and exerts pressure on the membrane 15. This pressure can be adjusted to a desired value via the pressure reducer 31, e.g. to 2 bar. However, oxygen cannot flow through the cathode chamber 14 due to the closed magnetic valve 28.

A methanol/water mixture is present in the anode chamber 13 and in the anode circuit 16. The temperature of the methanol/water mixture assumes values of approximately 110°. The coolant pump 22 and the dosing pump 25 as well as the pump 41 are switched-off. The heater 20 and the compressor-expander unit 37 are likewise switched-off.

Should the temperature of the methanol/water mixture fall-off over time to a temperature of e.g. approximately 100°, the heater 20 and the coolant pump 22 are switched-on. The methanol/water mixture is thereby circulated through the anode circuit 16 and warmed.

The electrical components of the fuel cell system 11 which are switched on during the standby state are provided with electrical energy from the alternating current power network 6.

The nitrogen pressure in the tank 45 is transferred into the anode chamber 13 via the separator 19 of the anode circuit 16. This pressure can thereby be adjusted by means of the pressure reducer 44 to a desired value, e.g. 2 bar. The methanol/water mixture is thereby present on the membrane 15 at this pressure.

The membrane 15 is proton conducting. The methanol/water mixture present in the anode chamber 13 is converted into carbon dioxide with the release of hydrogen protons and electrons. The hydrogen protons pass through the membrane 15 and react with the oxygen in the cathode chamber 14 to produce water. The electrons produced by these chemical reactions create the electrical current and voltage at the electrical cable 12.

In the standby state of the fuel cell system 11, the cathode chamber 14 is closed off at at least one side so that oxygen is present in, but cannot flow through the cathode chamber 14. Consequently, the above mentioned chemical reactions occur until the oxygen supply is exhausted. This generates an electrical voltage on the cable 12.

Figure 3:
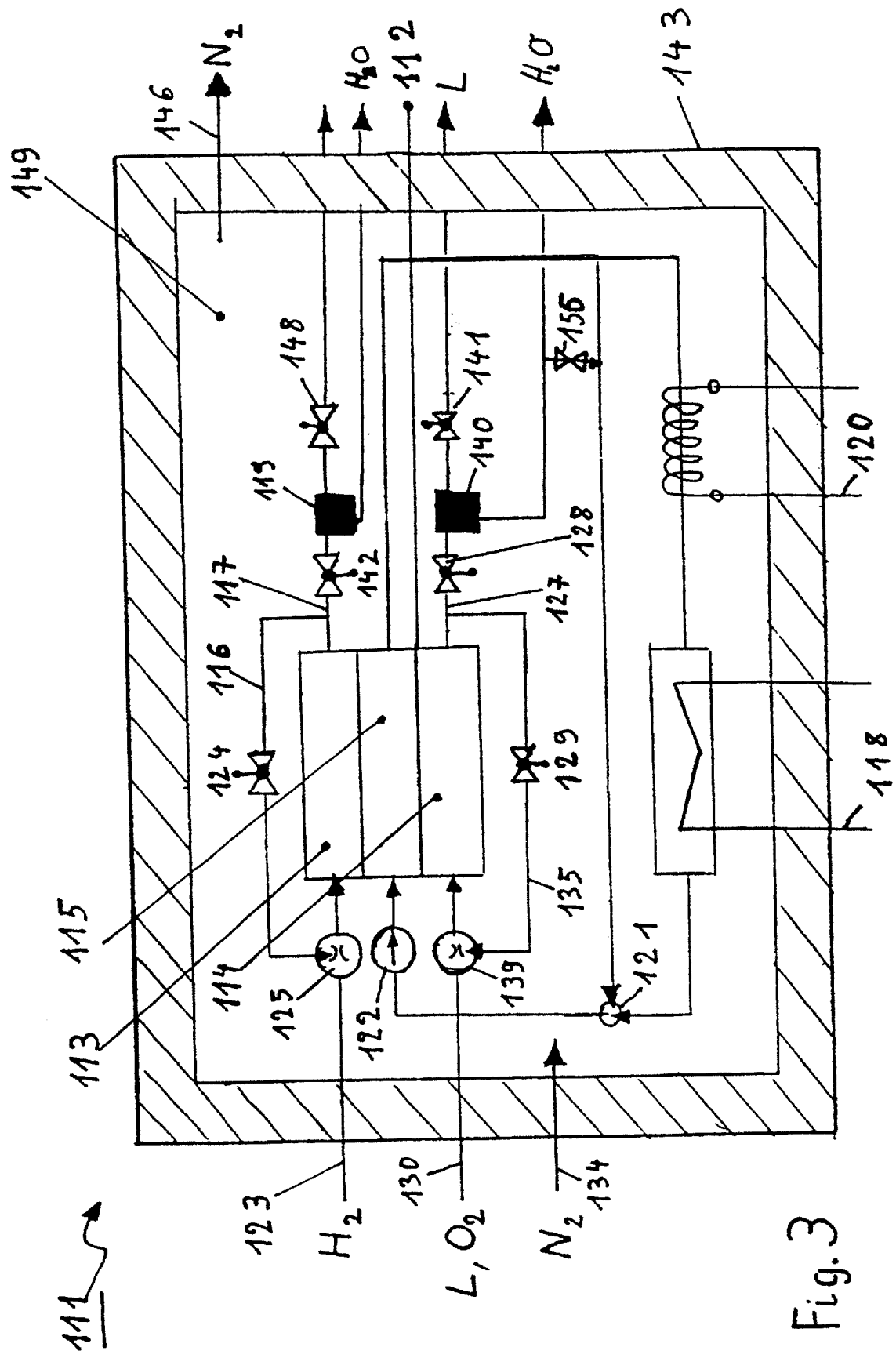
FIG. 3 shows a schematic block circuit diagram of a second embodiment of a fuel cell in accordance with the invention for use in a system according to FIG. 1.
Figure 4:
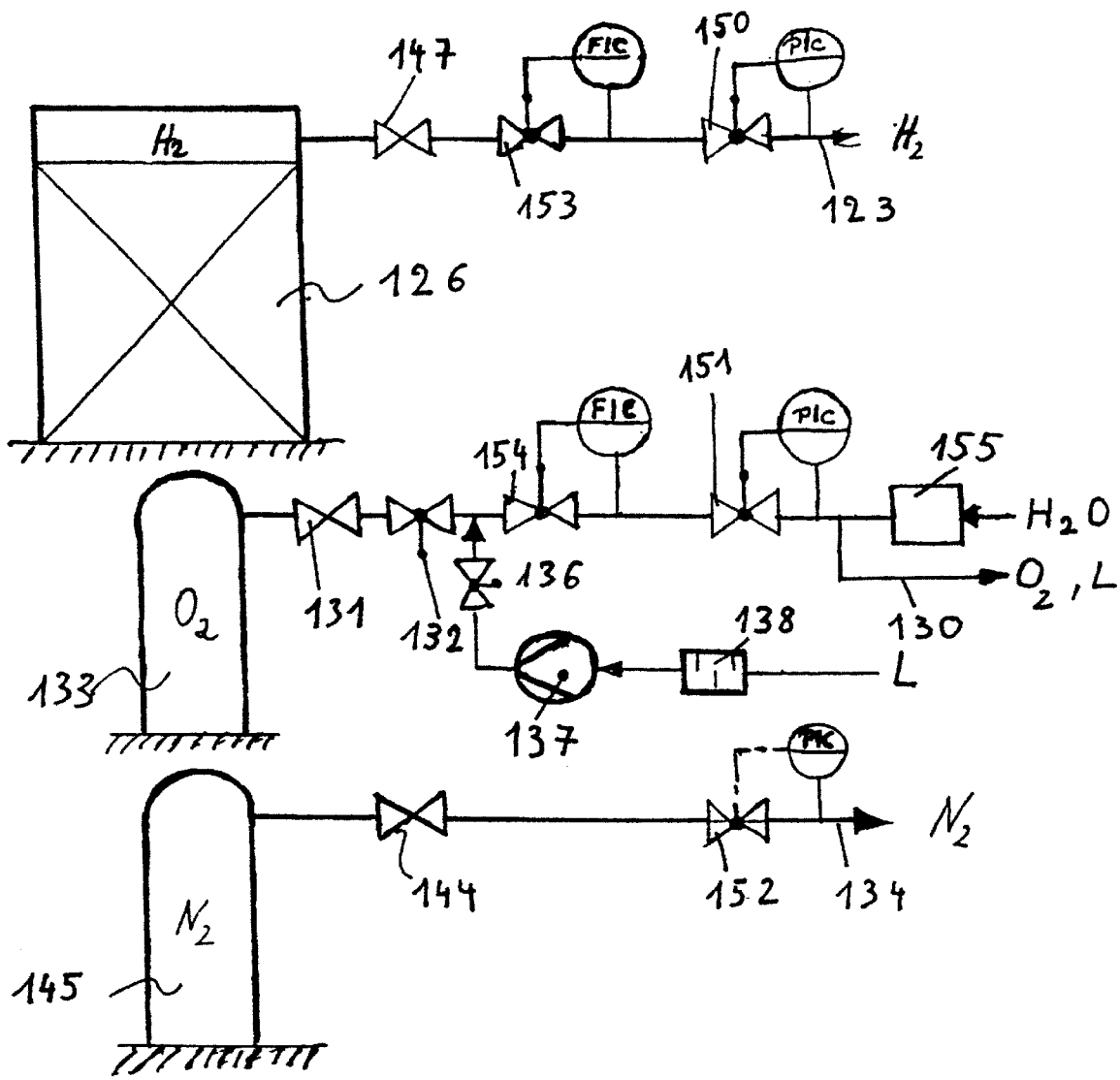
FIG. 4 shows a schematic block circuit diagram of the gas inlet to the fuel cell shown in FIG. 3.

A second embodiment of the fuel cell system is shown in detail in FIGS. 3 and 4. The fuel cell system 111 has an anode chamber 113 and a cathode chamber 114 which are separated by a proton conducting membrane 115, as well as a temperature controlled circuit. The anode chamber 113, the cathode chamber 114 and the membrane 115 form a hydrogen fuel cell (PEMFC) in which electrical energy is produced by electrochemical processes. This energy can be tapped at electrical conduit 112 as electrical voltage and current.

The anode chamber 113 is connected to a blocking member, magnetic valve 142, via an anode outlet 117. A separator 119 is located downstream of the blocking member 142 having a drain for water and an output for gas and feeds to the external environment via valve 148. The anode chamber 113 is likewise connected to an anode circuit 116 which, via an anode outlet 117, a magnetic valve 124, and a fluid entrainment pump 125, is connected to the anode inlet 123. In addition, the anode inlet 123 is connected to a hydrogen tank 126 via at least one pressure reducer 147. The hydrogen tank could be a pressurized vessel or a metal-hydride storage unit.

The cathode chamber 114 is connected to a blocking member, a magnetic valve 128, via a cathode outlet 127. A separator 140 is disposed downstream of the blocking member 128 and has a drain for water and an outlet for gases, which escape via valve 141 to the outside. The cathode outlet 127 is connected, between the cathode chamber and the magnetic valve 128, to the cathode inlet 130 via a cathode circuit 135 having a magnetic valve 129 and a fluid entrainment pump 139. In addition, the cathode chamber 114 is connected to an oxygen tank 133 via the cathode inlet 130, a pressure reducer 131, and a magnetic valve 132. The cathode inlet 130 is likewise connected to a compressor unit 137. One of the inputs of the unit 137 intakes air via a filter 138.

The fuel cell is likewise equipped with a temperature controlled circuit. The cooling water is circulated via a circulation pump 122 past a heater 120 and a cooler 118. A three-way thermostat valve 121 facilitates bypass for the cooler 118 and for the heater 120 when the temperature of the cell lies in the set-point region between 80 to 90° C. When the temperature falls below 70°, the thermostatic valve 121 switches circulation through the switched-on heater powered by the power mains during the standby mode.

The anode chamber 113, the cathode chamber 114, the membrane 115, the anode circuit 116, the cathode circuit 135, the temperature controlled circuit having the cooler 118, the heater 120 and the circulating pump 122, separators 119 and 140, as well as the inlet and outlet conduits thereof are accommodated within a housing 143. The housing 143 is pressure-tight, pressure resistant and heat insulated. The housing 143 is connected to a tank 145 via an inlet 134 and a pressure reducer 144. The tank 145 contains nitrogen provided as a pressurizing agent.

When the alternating current power network 6 operates properly, the fuel cell system 111 is located in a standby state in which the magnetic valves 128 and 142 are closed. Magnetic valves 124 and 129 are also closed and the magnetic valve 132 is opened. The closed magnetic valve 128 and the opened magnetic valve 132 clause the cathode chamber 114 to be filled with oxygen from the tank 133. The oxygen is present at a pressure on the membrane 115. The pressure can be adjusted to a desired value using a pressure reducer 131 e.g. 2 bar. However, since the magnetic valves 128 and 129 are closed, the oxygen cannot flow through the cathode chamber 114. The anode chamber 113 is filled with hydrogen from the tank 126, with the magnetic valve 142 being closed. The hydrogen is present under pressure on the membrane 115. The pressure can be adjusted to a desired value using pressure reducer 147 to, e.g. the same pressure as that in the cathode chamber. Since the magnetic valves 142 and 124 are closed, hydrogen cannot flow through the anode chamber. The nitrogen pressure present in the inner region 149 of the housing 143 can likewise be adjusted via pressure reducer 144. The nitrogen can be released into the surroundings via a drain 146 and a burner (not shown). A pressurized (2 to 4 bar) fuel cell has leakage losses of approximately 1 to 2 mbar per minute in the absence of a counter-pressure from nitrogen in chamber 149. Accordingly, an explosive gas mixture comprising $H_2+O_2$ would occur inside the housing after a certain period of time. This is avoided by pressurizing the housing using $N_2$. Since a small degree of $H_2$ diffusion cannot be completely avoided despite this $N_2$ overpressure, a slow $N_2$ rinsing of the housing 143 is effected via the drain 146 and the burner.

FIG. 4 shows a possible regulation of the gas pressure and flow. The three pressure reducers 131, 144 and 147 are adjusted to effect a constant intermediate pressure step which e.g. reduces the pressure in the containers of 200 bar to 6 bar. The fine adjustment is effected, in each case, via three downstream PIC valves (pressure indicated control) 150, 151, 152. When the network power is interrupted and $H_2+O_2$ usage occurs, these valves remain open up to a predetermined value of the pressure. In the standby state, these valves are closed and the gases are present at the predetermined pressure on the membrane 115. Each of the valves 150 and 151 in the $H_2$ and $O_2$ inlets has two FIC valves upstream thereof (flow indicated control) 153, 154 for mass flow regulation.

The membrane 115 is proton conducting. The $H_2$ present in the anode chamber 113 emits electrons and hydrogen protons. The hydrogen protons pass through the membrane 115 and react with the oxygen in the cathode chamber 114 to produce water. The electrons produced by this chemical reaction cause the above mentioned electrical voltage on the electrical cable 112.

The circulating pump 122, the heater 120 and the cooler unit 118 are in automatically switched off and on in the standby state. Should the temperature of the cell decrease in time and fall below a temperature of e.g. approximately 70° C., the heater 120 is switched-on. The water is circulated through the temperature control circuit and warmed. Components of the fuel cell system 111 which are switched-on in the standby state are supplied with electrical energy from the alternating current power network 6.

Departing from the standby state, the manner of functioning of the fuel cell system in accordance with the invention in the event of a power failure will now be described with reference to the two embodiments 11 and 111, respectively.

When the fuel cell system 11 or system 111, in the standby state, is initially subjected to an electrical load, for example applied by the users 2, the above mentioned voltage rapidly sinks due to the closed-off cathode chamber 14 or 114 and the associated limited amount of available oxygen. The amount of current which can therefore be delivered by the fuel cell system at this point in time is therefore relatively small. The voltage and the current capacity depend on the volume of the anode chamber 13 or 113 and of the cathode chambers 14 and 114, that is to say, on the number of available stacks.

However, in accordance with the invention, when a breakdown in the alternating power network 6 is detected by the control apparatus 9, the magnetic valves 28 and 128 are opened. The fuel cell system 11, 111 is thereby transferred into its operational state. The cathode chambers 14, 114 are thereby no longer closed off and oxygen can flow through the cathode chamber 14, 114. Continuous chemical reactions can thereby take place in the fuel cell system 11, 111. The methanol/water mixture continuously reacts in the system 11 within the cathode chamber 13 with release of hydrogen protons and electrons to form carbon dioxide, the hydrogen protons pass through the membrane 15, 115 to react with the oxygen in the cathode chamber 14, 114 and produce water. The continuously generated electrons produce a continuous current and voltage, which is available for tapping by the cable 12, 112.

This electrical voltage on cable 12, 112 is buffered by the capacitor 10 and passed onto the electrical users 12 via the DC-AC converter 7 and the users are thereby provided with current from the fuel cell system 11, 111. In this operational state the fuel cell system replaces the alternating current power network 6 energy supply to the user 2.

When the fuel cell system 11 has switched from the standby state into the operational state, the bypass magnetic valves 35 and 42 are opened, in addition to the above mentioned magnetic valve 28. The motor 36 and the compressor expander unit 37 as well as the pump 41 and the coolant pump 22 are also switched-on, and the heater 20 is switched-off.

Heat is produced by the continuous chemical reactions during the operational state. The methanol/water mixture thereby leaves the anode chamber 13 with a temperature of approximately 110° and is then cooled by the cooler 18 to a temperature of about 40°. Gaseous carbon dioxide is separated in the downstream separator 19 and input to the catalytic burner 29 via the opened magnetic valve 42, where it is burned together with likewise separated residual methanol. The exhaust gases which thereby occur are expanded by the switched-on compressor-expander unit 37 and water is recaptured with the assistance of the cooler 39. This water can be introduced to the separator 19 in the anode circuit 16 via the switched-on pump 41. The cooled methanol/water mixture present in the separator 19 then regains entrance to the anode chamber 13 via the thermostat valve 21. The methanol/water mixture is thereby mixed via the separator 24, in dependence on the thermostat valve 21, with exactly that amount of hot methanol/water mixture which, together, produces a mixture of approximately 90° to approximately 110°, which is then present at the anode inlet 23. Excess hot methanol/water mixture is passed out of the separator 24 into the cooler 18. In addition, the dosing pump 25 is switched on during the operational state of the fuel cell system 11 to introduce fresh methanol into the anode circuit 16.

In a first brief time period between approximately 2 seconds to approximately 20 seconds, e.g. 4 to 5 seconds, following transition of the fuel cell system 11 from the standby state into the operational state, oxygen is introduced into the cathode chamber 14 from the tank 33. During this period of time, the compressor-expander unit 37, which is switched-on at the transition time, warms up to its operational rate of revolution. During this warm-up time, the air which is suctioned in by the compressing portion of the compressor-expander unit 37 via the filter 38 is passed off via the opened bypass magnetic valve 35. After the system has achieved its operational state, i.e. after expiration of the above mentioned time interval, the magnetic valve 34 is opened and the bypass magnetic valve 35 is closed. The air intake of the pressure portion of the compressor-expander unit 37 is thereby introduced into the cathode chamber 14. The cathode chamber 14 thereby acquires the oxygen necessary for the chemical reactions via this intake air. The magnetic valve 32 is then closed so that no further oxygen can flow from the tank 33 into the cathode chamber 14.

In the fuel cell system 111, the magnetic valves 129, 142 and 124 are also opened during the transition between the standby state into the operational state, in addition to the magnetic valve 128. The magnetic valves 141 and 148 are initially closed in the operational state.

The gas feedback in the anode circuit 116 and the cathode circuit 117 effects mixing between dry saturated exhaust gases and dry pressurized oxygen and hydrogen. Additional moisturizing is not necessarily required. The pressure loss associated with the re-circulation of the gases is compensated for with the assistance of entrainment pumps 125 and 139.

In the operational state, the electrochemical reactions produce sufficient heat so that the heater 120 is no longer needed. If excessive temperatures are achieved, the circulating pumps can be utilized to bring the cooling water temperature to about 80° C. using the cooler 118. The $H_2O$ produced by the electrochemical reactions can then be separated in the separators 119 and 140 and can be fed to the temperature controlled circuit via a valve 156 or (the conduit is not shown) to an air moisturizer 155 in the conduit 130.

For power interruptions in excess of 18 s to 20 s, switch-over is effected from oxygen operation to air operation. The compressor 137 reaches its operational speed and intakes air via the filter 138. After the air is pressurized, the magnetic valves 136 and 141 open and the magnetic valves 132 and cathode circuit magnetic valve 129 are closed. The valve 148 can be opened from time to time for gas removal reasons (purging). The air can also be moisturized via a humidifier 155. A mass flow regulation of the $H_2$ flow, of the initial $O_2$ flow and of the subsequent air flow is effected via the PIC and FIC valves 150, 151, 152, 153, 154, which are opened during the operational state.

The electrical components of the fuel cell system 11 and 111 which are switched-on during the operational state are thereby supplied with electrical energy from the fuel cell system itself.

The fuel cell system thereby provides interruption-free power supply for the user 2 during its operational state following breakdown of the alternating current power network 6 using the oxygen delivered from the tank 33, 133. After switch-over to the compressor 37, 137 and after switching-off tank 33, 133, the fuel cell system 11, 111 constitutes a substitute network power system using substantially only methanol or $H_2$. The oxygen in tank 33, 133 and the nitrogen in tank 45, 145 are used to only an insignificant extent, or not at all.

In the standby state, the amount of oxygen used, the amount of nitrogen used and the amount of $H_2$ or methanol used by the fuel cell system are almost zero. Electrical energy is used only at certain times for the heater 20, 121 and the cooling pump 20, 120.

We claim:

1. A fuel cell system comprising:
   an anode chamber;
   a cathode chamber;
   a proton conducting membrane disposed between and separating said anode chamber and said cathode chamber;
   means for supplying fuel to said anode chamber during an operational state;
   means for supplying an oxidant to said cathode chamber during said operational state;
   means for filling said anode chamber with fuel during a standby state;
   means for filling said cathode chamber with oxidant during said standby state; and
   means for preventing oxidant flow through said cathode chamber during said standby state, wherein said cathode chamber is connected to a cathode outlet having a cathode outlet blocking member which is closed in the standby state.

2. The fuel cell system of claim 1, wherein said oxidant comprises gaseous oxygen and further comprising means for the exertion of pressure with said oxidant on said membrane.

3. The fuel cell system of claim 2, wherein said oxidant comprises air and further comprising means for the exertion of pressure with said air on said membrane.

4. The fuel cell system of claim 1, wherein said blocking member comprises a magnetic valve.

5. The fuel cell system of claim 1, wherein said cathode chamber is connected to a cathode inlet which, via a first blocking member, is connected to a least one tank filled with said oxidant, wherein said first blocking member is opened during said standby state.

6. The fuel cell system of claim 5, further comprising a pressure reducer disposed in said cathode inlet.

7. The fuel cell system of claim 5, wherein said first blocking member comprises a first magnetic valve.

8. The fuel cell system of claim 5, wherein the cathode chamber is connected, via said cathode inlet and a second blocking member to a compressor means, said compressor means intaking gas.

9. The fuel cell system of claim 8, wherein said second blocking means comprises a second magnetic valve.

10. The fuel cell system of claim 8, wherein said gas comprises air.

11. The fuel cell system of claim 1, further comprising means for the exertion of pressure with said fuel on said membrane.

12. The fuel cell system of claim 1, wherein said anode chamber is connected to an anode circuit.

13. The fuel cell system of claim 12, wherein said fuel comprises a water/methanol mixture and said anode circuit comprises temperature control means.

14. The fuel cell system of claim 13, wherein said temperature control means comprise a pump and a heater.

15. The fuel cell system of claim 13, further comprising means for exerting pressure on said anode circuit with an inert gas.

16. The fuel cell system of claim 15, wherein said inert gas consists essentially of nitrogen.

17. The fuel cell system of claim 1, wherein said fuel comprises hydrogen and aid anode chamber is connected to an anode outlet having an anode outlet blocking member which is closed in said standby state.

18. The fuel cell system of claim 17, wherein said anode outlet blocking member comprises a third magnetic valve.

19. The fuel cell system of claim 17, wherein said anode chamber has an anode inlet connected to an anode circuit and said cathode chamber has a cathode inlet connected to a cathode circuit, said anode circuit comprising a first fluid entrainment pump and a fourth blocking member, said cathode circuit comprising a second fluid entrainment pump and a fifth blocking member.

20. The fuel cell system of claim 1, wherein said fuel cell system comprises a gas-tight housing, wherein said housing is connected to a gas pressure vessel.

21. The fuel cell system of claim 20, wherein said housing comprises means for heat insulation and wherein said pressure vessel contains nitrogen.

22. The fuel cell system of claim 1, further comprising a temperature control circuit.

23. The fuel cell system of claim 1, further comprising means for interruption-free current supply to at least one electrical user, means for supplying energy to said user from an alternating current power network, and means for supplying energy from said fuel cell system to said user in the event of breakdown in the alternating current power network, wherein said fuel cell system is normally in the standby state.

24. A method for operating the fuel cell system of claim 1, the method comprising the steps of:

a) filling said anode chamber with fuel during a standby state of the fuel system;

b) filling said cathode chamber with oxidant, during said standby state, said anode chamber separated from said cathode chamber by said proton conducting membrane;

c) preventing oxidant flow through said cathode chamber during said standby state;

d) detecting breakdown in an alternating current power network normally supplying energy to a user;

e) switching the fuel cell system into an operational state following step d), wherein oxidant is permitted to flow through said cathode chamber;

f) supplying fuel to said anode chamber following step e); and g) supplying oxidant to said cathode chamber following step e).

25. The method of claim 24, further comprising preventing fuel flow through said anode chamber during said standby state.

26. The method of claim 24, further comprising exerting pressure on said membrane with said fuel and said oxidant during said standby state.

27. The method of claim 24, wherein step e) comprises the step of opening a cathode outlet blocking member.

28. The method of claim 27, wherein step b) comprises introducing oxidant into said cathode chamber from a tank and step g) comprises suctioning a gas into said cathode chamber.

29. The method of claim 28, wherein said gas comprises air.

30. The method of claim 27, wherein step e) comprises the step of opening an anode outlet blocking member.

31. The method of claim 24, further comprising keeping the fuel cell system under gas pressure within an inner chamber of a housing.

32. The method of claim 31, wherein said gas pressure is exercised using nitrogen.

33. The method of claim 24, further comprising maintaining the fuel cell at an operational temperature.

* * * * *